United States Patent
Polcuch

(10) Patent No.: US 11,628,926 B2
(45) Date of Patent: Apr. 18, 2023

(54) LVDT-BASED ACTUATOR OUTPUT LOAD LIMITED

(71) Applicant: Parker-Hannifin Corporation, Cleveland, OH (US)

(72) Inventor: Eric A. Polcuch, Mission Viejo, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 757 days.

(21) Appl. No.: 16/524,500

(22) Filed: Jul. 29, 2019

(65) Prior Publication Data
US 2020/0039637 A1 Feb. 6, 2020

Related U.S. Application Data

(60) Provisional application No. 62/713,845, filed on Aug. 2, 2018.

(51) Int. Cl.
| | | |
|---|---|---|
| *B64C 13/16* | (2006.01) | |
| *F16H 25/12* | (2006.01) | |
| *B64C 5/10* | (2006.01) | |
| *F16H 61/12* | (2010.01) | |
| *F16H 59/50* | (2006.01) | |

(52) U.S. Cl.
CPC ............. *B64C 13/16* (2013.01); *B64C 5/10* (2013.01); *F16H 25/12* (2013.01); *F16H 61/12* (2013.01); *F16H 59/50* (2013.01)

(58) Field of Classification Search
CPC . B64C 13/16; B64C 5/10; F16H 25/12; F16H 61/12; F16H 59/50; F16H 25/2003
See application file for complete search history.

(56) References Cited

U.S. PATENT DOCUMENTS

| | | | |
|---|---|---|---|
| 8,496,204 B1 | 7/2013 | Charafeddine et al. | |
| 10,040,539 B2 | 8/2018 | Antunes et al. | |
| 2007/0051847 A1* | 3/2007 | Quitmeyer | H02K 7/06 475/5 |
| 2007/0220998 A1* | 9/2007 | Kopecek | F16H 25/2454 74/89.38 |
| 2011/0048147 A1* | 3/2011 | Keech | F16H 25/205 74/89.26 |
| 2013/0001357 A1* | 1/2013 | Cyrot | B64C 13/341 244/99.4 |

(Continued)

FOREIGN PATENT DOCUMENTS

| | | |
|---|---|---|
| DE | 102011018446 A1 | 10/2012 |
| WO | WO 2011096913 A1 | 8/2011 |

*Primary Examiner* — Rodney A Bonnette
(74) *Attorney, Agent, or Firm* — Renner, Otto, Boisselle & Sklar, LLP

(57) ABSTRACT

An actuator assembly includes a primary load path for tightly coupling an actuated surface to a reference structure, and a secondary load path having a backlash portion for coupling the actuated surface to the reference structure with backlash, wherein the secondary load path is unloaded during an operative state of the primary load path and loaded during a failure state of the primary load path. A first sensor is configured to sense relative displacement between a portion of the primary load path and a portion of the secondary load path. A controller is operatively coupled to the first sensor, the controller configured to determine a load on the primary load path based on relative displacement sensed by the first sensor.

17 Claims, 15 Drawing Sheets

(56) References Cited

U.S. PATENT DOCUMENTS

2017/0313409 A1\* 11/2017 Edwards ................. B64C 13/28
2018/0100790 A1     4/2018 Schleuter et al.
2018/0162550 A1\*  6/2018 Hale ...................... B64D 45/00
2018/0194454 A1\*  7/2018 Olson ....................... B64C 5/02

\* cited by examiner

LVDT-BASED ACTUATOR OUTPUT LOAD LIMITED

FIELD OF INVENTION

The present invention relates generally to protecting an actuator and the external attachment structure from excessive load application in the event of an external jam in actuators having a primary and a secondary load path, and more particularly to using displacement data between the primary and secondary load paths to determine a load in the primary load path of the actuator for use in determining required action to limit the output loads for linear electro-mechanical actuators.

BACKGROUND OF THE INVENTION

Modern aircraft have horizontal stabilizers located at the tail section of the fuselage, empennage, or vertical stabilizer. The stabilizers are pivotally supported relative to the airplane fuselage to "trim" the aircraft pitch (nose up or down) during flight by selective adjustment by the pilot or auto-pilot from an internal control unit. This involves adjusting the position of the horizontal stabilizer by a stabilizer actuator to accommodate different load distributions, thrust and drag conditions i.e. flaps and landing gear deployment within the aircraft and different atmospheric conditions, i.e., wind, rain, snow, etc. In this regard the stabilizer is traditionally pivotally connected to the tail section of the fuselage at a point generally midway along its length.

Horizontal Stabilizer Trim Actuators (HSTA), Trimmable Horizontal Stabilizer Actuators (THSA), and Pitch Trim Actuators (PTA) are terms commonly used to describe these actuators. HSTAs are typically linear mechanical actuators driven by either electric or hydraulic motors. One common HSTA configuration consists of a primary ball screw with a translating ball nut assembly connected with an actuating drive gimbal which is pivotally connected to one end of the horizontal stabilizer structure. The ball nut assembly includes a ball nut housing with a rotatable ball screw extending axially and usually vertically through the ball nut housing and a drive gimbal housing. The ball nut housing is connected to the drive gimbal housing by a pair of pins or trunnions. The ball screw, in turn, may have its upper end remote from the actuating drive gimbal and may be fixed from translation or axial movement by a connection to a second, support gimbal which is pivotally secured to the fixed aircraft structure. (Note that for Tee Tail aircraft the movable ball nut is typically on the top connected to the horizontal stabilizer and the ball screw is axially connected to the lower fixed structure of the vertical tail, operation is similar in both configurations). As the ball screw is rotated, the drive gimbal will be moved in translation relative to it. Thus, as the ball screw is rotated in one direction, the leading edge of the horizontal stabilizer is pivoted upward, whereas by rotating the ball screw in the other direction, the leading edge of the horizontal stabilizer is pivoted downward. Rotation of the ball screw is routinely done by a motor and associated gearing which is connected to the second, fixed support gimbal and which is actuated by the pilot or auto-pilot by the internal control unit. The connection of the stabilizer actuator to the stabilizer is often located within the fuselage tail section, empennage, or vertical stabilizer and not directly in the air stream. Note that the rotational to translational motion conversion is typically achieved with a ball screw, this invention applies equally to, but is not limited to, other rotary to linear devices such as acme screws and roller screws.

The horizontal stabilizer movement, as controlled by the Pilot or auto-pilot, is transmitted by the ball screw through the actuating drive gimbal by way of the primary ball nut assembly which defines a primary load path. The movement has a load with tensile and compressive components as well as a torque component due to the ball screw thread lead. Failures of the primary load path such as, for example, a mechanical jam can result in shearing off of the connecting trunnion segment and can result in the complete loss of control of the horizontal stabilizer. However, current state of the art stabilizer actuators are provided with a secondary load path as a protection against the catastrophic failure of the primary path (ball screw or any primary load path components).

For safety, it is desirable to detect an event, such as a mechanical jam, of the stabilizer surface as soon as possible so that excessive loads and subsequent mechanical failure can be prevented.

SUMMARY OF THE INVENTION

Some actuator systems include a displacement feedback device between the normally loaded primary load path and normally unloaded secondary load path for detection of primary load path failures. This displacement feedback device may be, but is not limited to, a linear variable differential transformer (LVDT) or the like. This sensor provides displacement data between the primary and secondary load path to a controller. A system and method in accordance with the present invention utilizes the displacement data from the displacement feedback device in conjunction with the inherent mechanical compliance of the primary load path, to determine a load on the primary load path and, when the load exceeds a prescribed threshold (indicating a mechanical jam), generate an indication of excessive load that can be used to halt further movement of the actuator system. In this manner, it can be determined when a jam or like condition has occurred and the actuator system can be halted prior to structural damage to the aircraft, actuator system and/or associated components. Moreover, since an existing displacement feedback device is used an additional sensor is not needed, thereby reducing cost, weight and complexity of the system.

In accordance with one aspect of the invention, an actuator assembly includes: a primary load path for tightly coupling an actuated surface to a reference structure; a secondary load path having a backlash portion for coupling the actuated surface to the reference structure with backlash, wherein the secondary load path is unloaded during an operative state of the primary load path and loaded during a failure state of the primary load path; a first sensor configured to sense relative displacement between a portion of the primary load path and a portion of the secondary load path; and a controller operatively coupled to the first sensor, the controller configured to determine a load on the primary load path based on relative displacement sensed by the first sensor.

In one embodiment, the first sensor comprises a position sensor.

In one embodiment, the first sensor comprises a linear variable differential transformer.

In one embodiment, the assembly includes an actuator operatively coupled to the primary load path and the secondary load path, the actuator operative to effect motion along at least the primary load path, wherein the controller is configured to command the actuator to inhibit motion upon the determined load exceeding a prescribed load threshold.

In one embodiment, the actuator assembly includes a mechanical brake configured to selectively inhibit motion along at least the primary load path, wherein the controller is configured to command the brake to inhibit motion along at least the primary load path upon the determined load exceeding the prescribed load threshold.

In one embodiment, the controller determines the load based on a linear relationship between load on the primary load path, a relative stiffness between the primary and secondary load paths, and relative displacement between the primary and secondary load paths.

In one embodiment, the controller is configured to sense the failure state of the primary load path when the load exceeds a predetermined value.

In one embodiment, the controller is configured to detect a jam state in one of an upper or lower primary attachment system.

In one embodiment, the controller is configured to detect a failure state in at least one of a main housing, gimbal, primary attachment pins, or the ball screw of the primary load path.

In one embodiment, the controller is configured to detect a failure state in at least one of a primary nut gimbal housing, primary ball nut assembly, or trunnion.

In one embodiment, the actuator assembly includes a second sensor, wherein the controller is configured to detect a failure state in the other one of an upper or lower primary attachment system.

According to another aspect of the invention, an aircraft includes: a flight control surface arranged on the aircraft; and the actuator assembly as described herein.

According to another aspect of the invention, a method for determining load on a primary load path of an actuator includes: receiving sensor signals from one or more sensors; determining a relative displacement between a portion of the primary load path and a portion of a secondary load path based on the received signals; determining a load on the primary load path based on the relative displacement.

In one embodiment, the method includes inhibiting motion along the primary load path upon the determined load exceeding a prescribed load threshold.

In one embodiment, inhibiting motion comprises at least one of commanding an actuator operative to effect motion along the primary load path to halt motion along the primary load path or commanding a brake operatively selectively inhibit motion along the primary load path to inhibit motion along the primary load path.

In one embodiment, wherein determining the load comprises using a linear relationship between load on the primary load path, a relative stiffness between the primary and secondary load paths, and relative displacement between the primary and secondary load paths.

In one embodiment, the method includes: comparing the relative displacement to a predetermined range of values; and annunciating a jam in the primary load path if the relative displacement is within the predetermined range of values.

In one embodiment, the predetermined range of values is a range centered around a value determined by a summation of the amount of structural deformation in the primary load path during an operative state and an amount of backlash required for triggering a locking key to engage the secondary load path.

In one embodiment, annunciating the failure includes locking an actuator that effects motion along the primary load path.

These and other features of the invention are more fully described and particularly pointed out in the description and claims set out below, and this Summary is not intended to identify key features or essential features of the claimed subject matter. The following description and claims and the annexed drawings set forth in detail certain illustrative embodiments of the invention, and these embodiments indicate but a few of the various ways in which the principles of the invention may be used.

DETAILED DESCRIPTION

The principles of the present invention have particular application to flight control actuators for controlling a flight control surface of a vehicle, such as a horizontal stabilizer of an aircraft. Such flight control actuators may employ linear variable differential transformers (LVDTs) as displacement sensors between the primary and secondary load paths to detect open failures of the primary load path and thus the invention will be described chiefly in the context of a flight control surface that employs LVDTs. However, it will be understood that the invention is applicable to other actuators including linear and rotary actuators where there is a need to determine a mechanical jam or binding in the attached aircraft system and may be used with any appropriate displacement sensor.

An exemplary system to which principles of the invention may be applied is described below. It is noted that the motion provider for the actuator described herein need not be an electric motor and/or the assembly need not include rotational members such as the ball screw and the ball nut. The motion provider could instead comprise of hydraulic or pneumatic motors or hydraulic and/or pneumatic cylinders, or any other device which can transfer linear movement to the actuated surface. That being said, relative rotational members, and especially those incorporating balls or rollers, often offer higher stiffness, lighter weight, lower cost, and/or greater packaging flexibility, and therefore, for the sake of brevity, the description will hereafter use the example of an electromechanical ball screw/ball nut actuator being used as a horizontal stabilizer trim actuator (HSTA) in an aircraft. However, it is understood that the invention works equally well with any actuator having a primary and a secondary load paths where in the primary load path carries all loads applied to the actuator and the secondary load path is effectively unloaded unless there is an open failure or fracture of the primary load path. The primary and secondary load paths may be concentric and, to some extent coextensive with one another in the single actuator.

Figure 1:
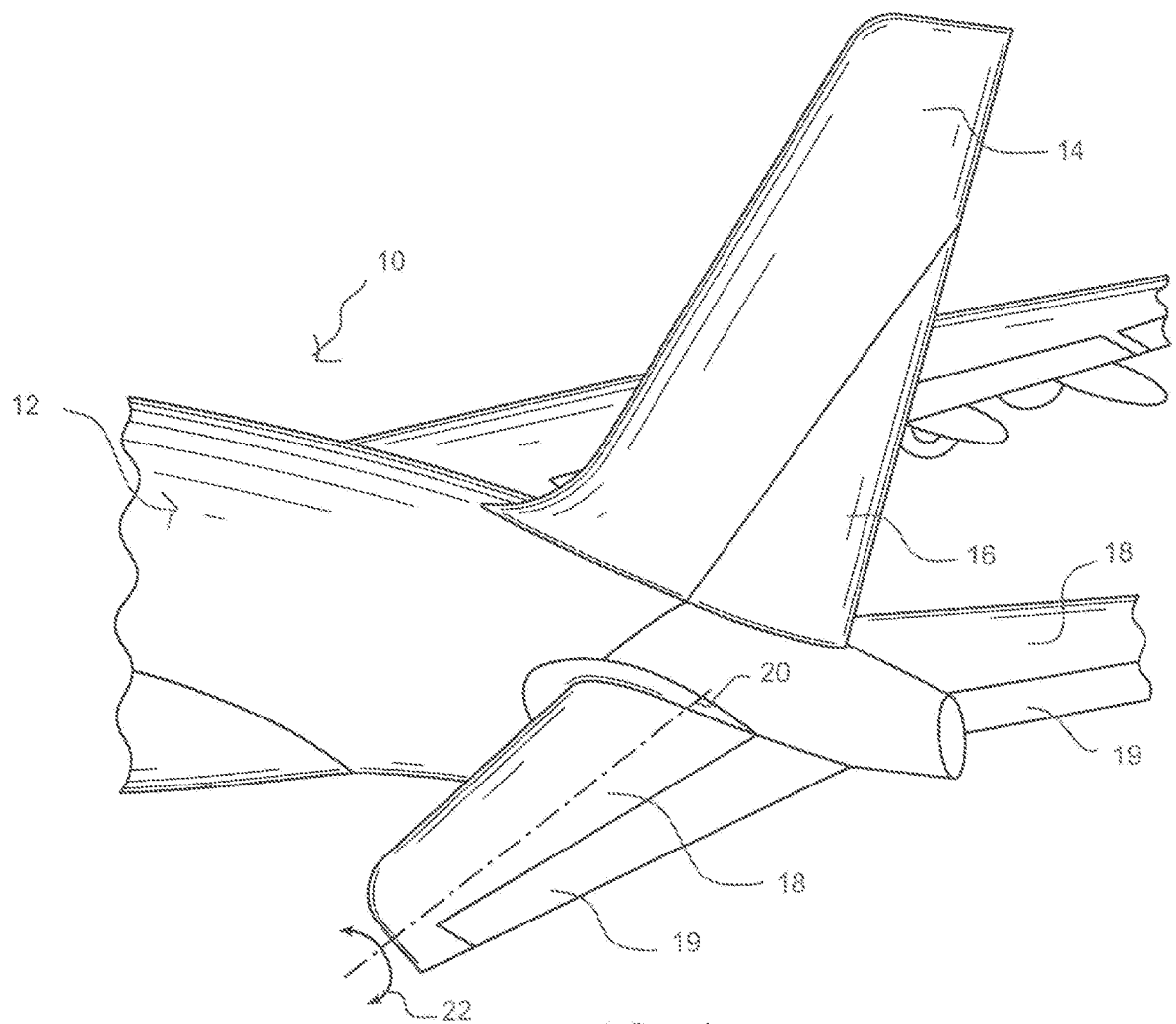
FIG. 1 is a simplified perspective view of the rear fuselage of an aircraft and the horizontal stabilizers pivotally mounted thereon.
Figure 2:
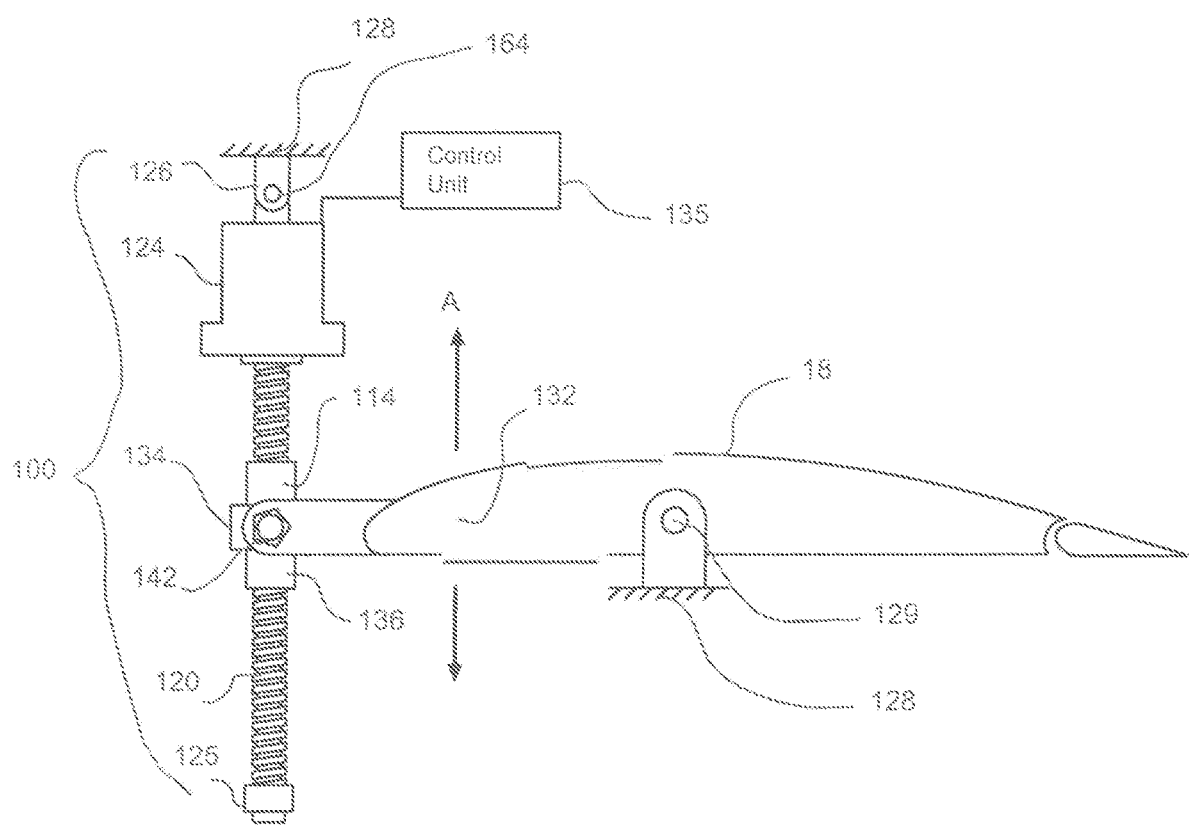
FIG. 2 is a schematic drawing generally depicting the assembly of the stabilizer actuator and the stabilizer relative to an aircraft empennage or tail section of the fuselage.
Figure 3:
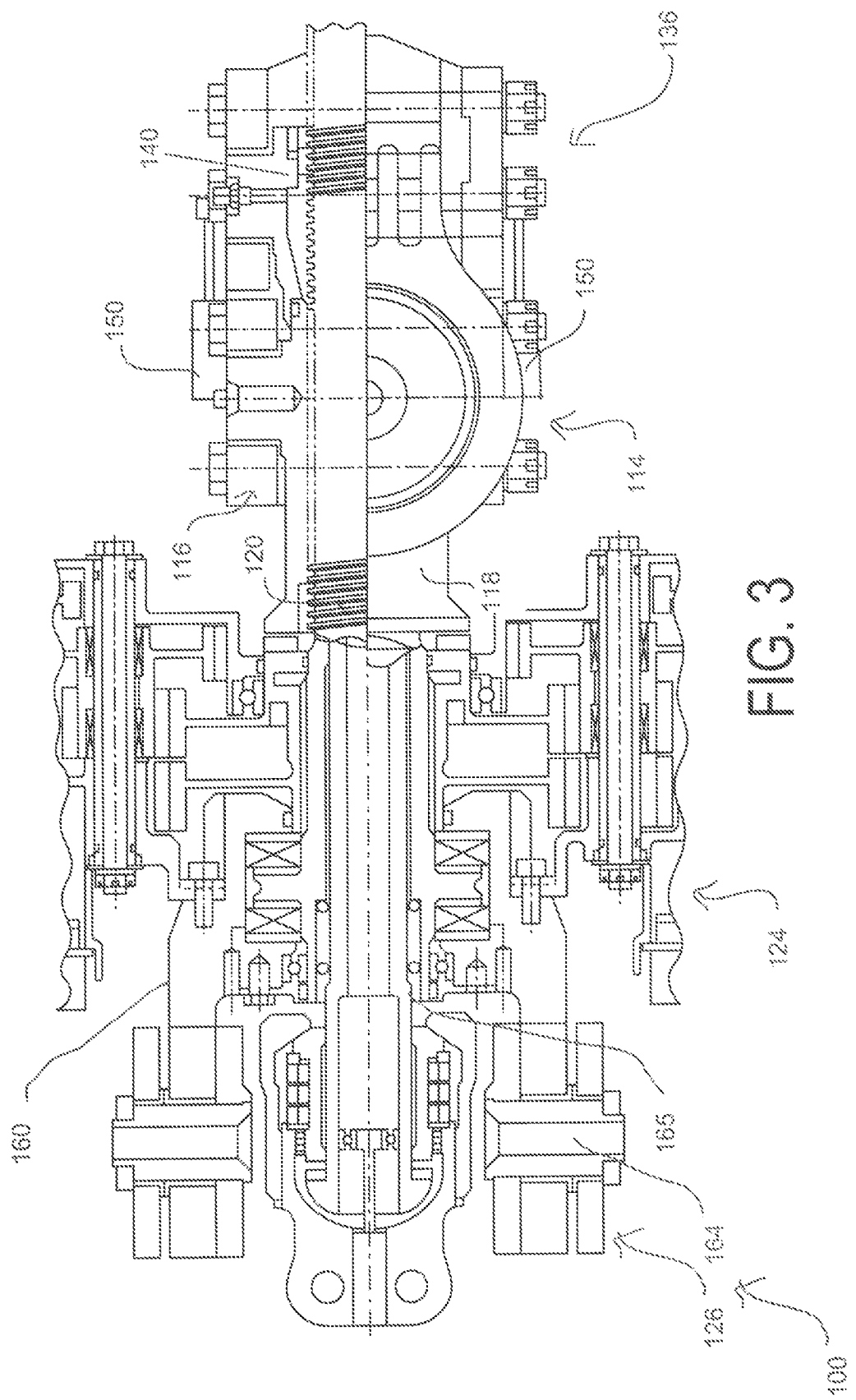
FIG. 3 is a schematic, partial sectional view generally depicting the assembly of the stabilizer actuator.
Figure 4:
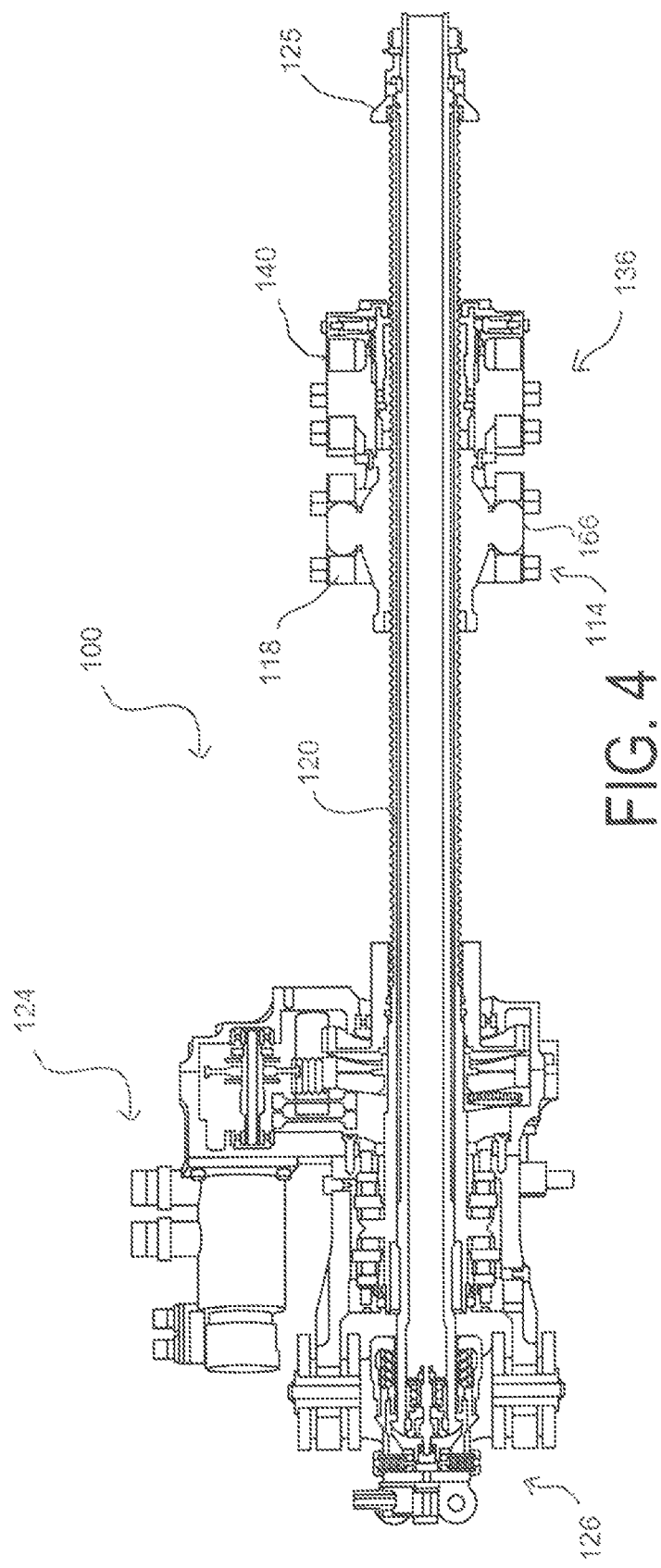
FIG. 4 is a cross-sectional view generally depicting the assembly of the stabilizer actuator.

Referring first to FIG. 1, an aircraft 10 can comprise a rear fuselage 12 having a Vertical Stabilizer 14 which carries a rudder 16 and horizontal stabilizers 18 and elevators 19 on either side thereof. Each horizontal stabilizer 18 is pivotally mounted to the fuselage at pivot point 20 whereby it can be pivoted about axis 22 to adjust the longitudinal pitch of (i.e., "trim") the aircraft 10. During flight, the horizontal stabilizer is adjusted by an actuator which moves its leading edge upward/downward relative to the axis 22. The stabilizer adjustments may be automatically controlled directly from the aircraft's flight computers (for example, an automatic flight control unit, or any automatic control unit in other applications) and/or may be manually controlled by pilot input.

With reference to FIGS. 2-10, a stabilizer actuator 100 is shown for selectively controlling the position of a horizontal stabilizer (or a control surface, more generally) 18. The actuator 100 includes a primary load path section generally indicated by the numeral 114 having a primary ball nut assembly 116. The primary ball nut assembly 116 includes a ball nut housing 118 connected by threads with a ball screw 120 via a plurality of nut ball members (not shown for clarity). The ball screw 120 may extend generally vertically and may be connected at its upper end to a hydraulic or electric drive motor and gear assembly 124. An end cap 125 may be fixed to the opposite lower end of the ball screw 120 to assure that the ball screw 120 will not be unthreaded from the primary ball-nut assembly 116. The drive motor and gear assembly 124 is connected to an upper support gimbal 126 which in turn is pivotally secured at a fixed position to a portion of the empennage or tail section 128 (more generally, a reference structure) of the fuselage. The drive motor and gear assembly 124 and the details thereof are of a construction well known in the art and thus it is only generally shown and described for purposes of simplicity and brevity.

The horizontal stabilizer 18 may be pivotally connected along its length by a pivot structure 129 which is fixed to the empennage or fuselage tail section. The forward end 132 of the horizontal stabilizer 18 may be in turn pivotally connected to an actuating drive gimbal 134 located generally midway along the ball screw 120 and which in turn is pivotally connected to the primary ball nut assembly 114 which is secured to the drive gimbal 134. The details of connection of stabilizer actuators to the empennage or fuselage tail section have been omitted for purposes of brevity and simplicity.

In order to selectively set the position of the horizontal stabilizer 18, the pilot through operation of an internal control unit 135 will energize the drive motor and gear assembly 124 to rotate the ball screw 120 in one direction which will move the primary ball nut assembly 116 and drive gimbal 134 upward along the axially fixed ball screw 120 to pivot the forward end 132 of the stabilizer 18 upward or to rotate the ball screw 120 in the opposite direction which will move the primary ball nut assembly 116 and drive gimbal 134 downward along the fixed ball screw 120 to pivot the forward end 132 downward. As this occurs the stabilizer actuator 100 may pivot at the fixed support gimbal 126 and pivot at the movable drive gimbal 134 to accommodate the angular, arcuate displacement of the forward end 132 of the stabilizer 18. Apparatuses such as an internal control unit 135 are generally well known in the art and thus known details thereof have been omitted for purposes of brevity and simplicity, except where discussed further below.

As will be seen, upon failure of the primary load path section 114 the secondary load path section 136 may be actuated to lock the stabilizer 18 in a fixed position or to control the stabilizer 18.

Looking now to FIGS. 3-7, the primary load path section 114 includes the primary ball nut gimbal 116 pivotally attached to the ball nut housing 118 with helically extending threads on its inner surface. A plurality of nut ball members is matingly located in the housing grooves. The ball screw 120 extends through the nut housing 118 and in turn has helically extending threads on its outer surface which are also adapted to matingly receive the nut ball members. As noted such basic structures, which are used to transfer loads by relative rotation with reduced friction, are well known in the art and hence the specific details thereof have been omitted for purposes of simplicity and brevity.

Thus, as noted, as the ball screw 120 is rotated, the primary ball nut assembly 118, which is fixed from rotation, along with the primary gimbal 116 will be moved axially in translation along the ball screw 120 to thereby pivot the horizontal stabilizer 18 about its pivot structure 129. This structure of the primary load section 114 then provides the primary load path for actuation of the horizontal stabilizer 18 as controlled by the operator.

Figure 5:
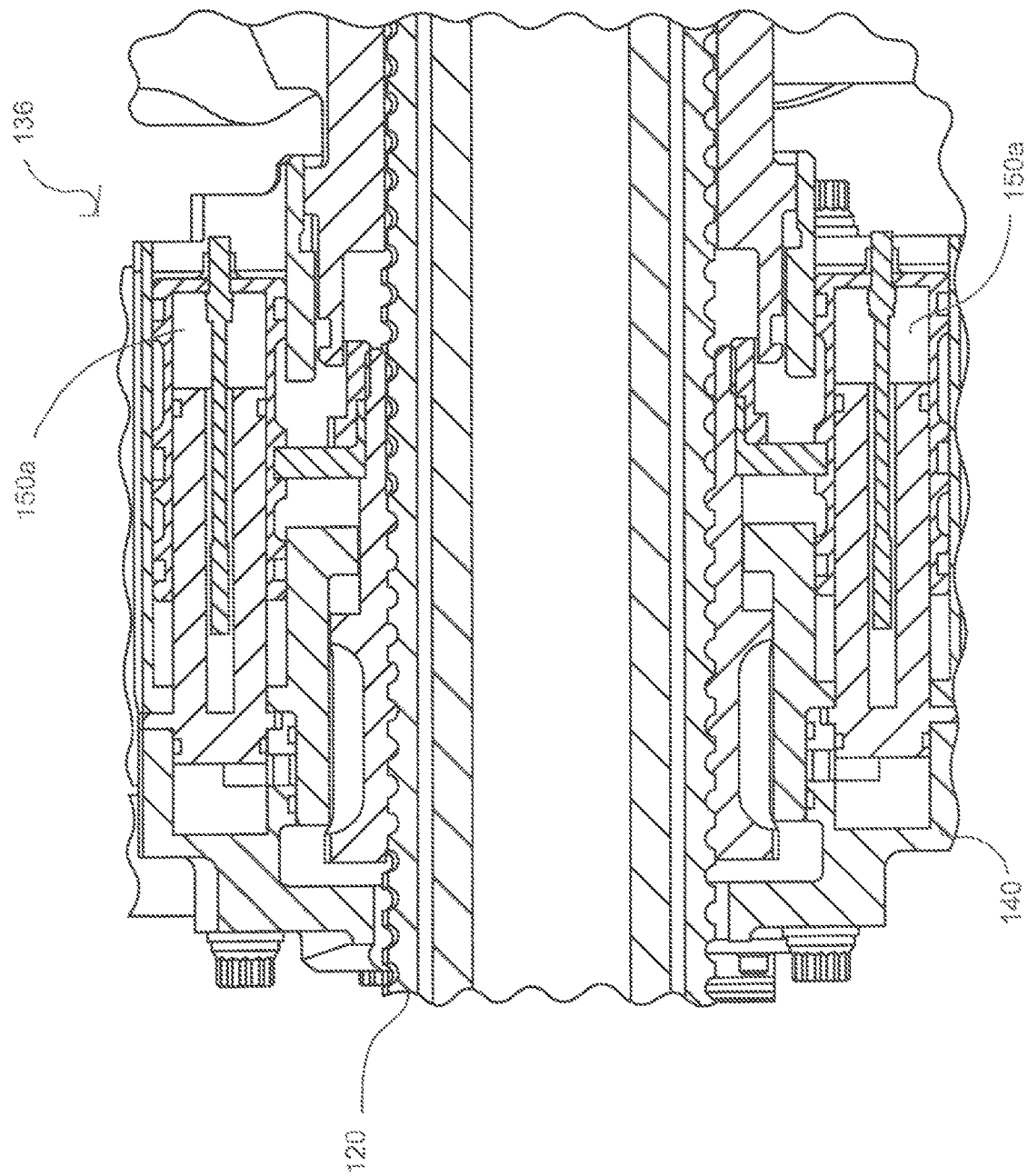
FIG. 5 is a cross-sectional view depicting the upper attachment assembly of the stabilizer actuator with LVDTs driven by a secondary ball nut.
Figure 6:
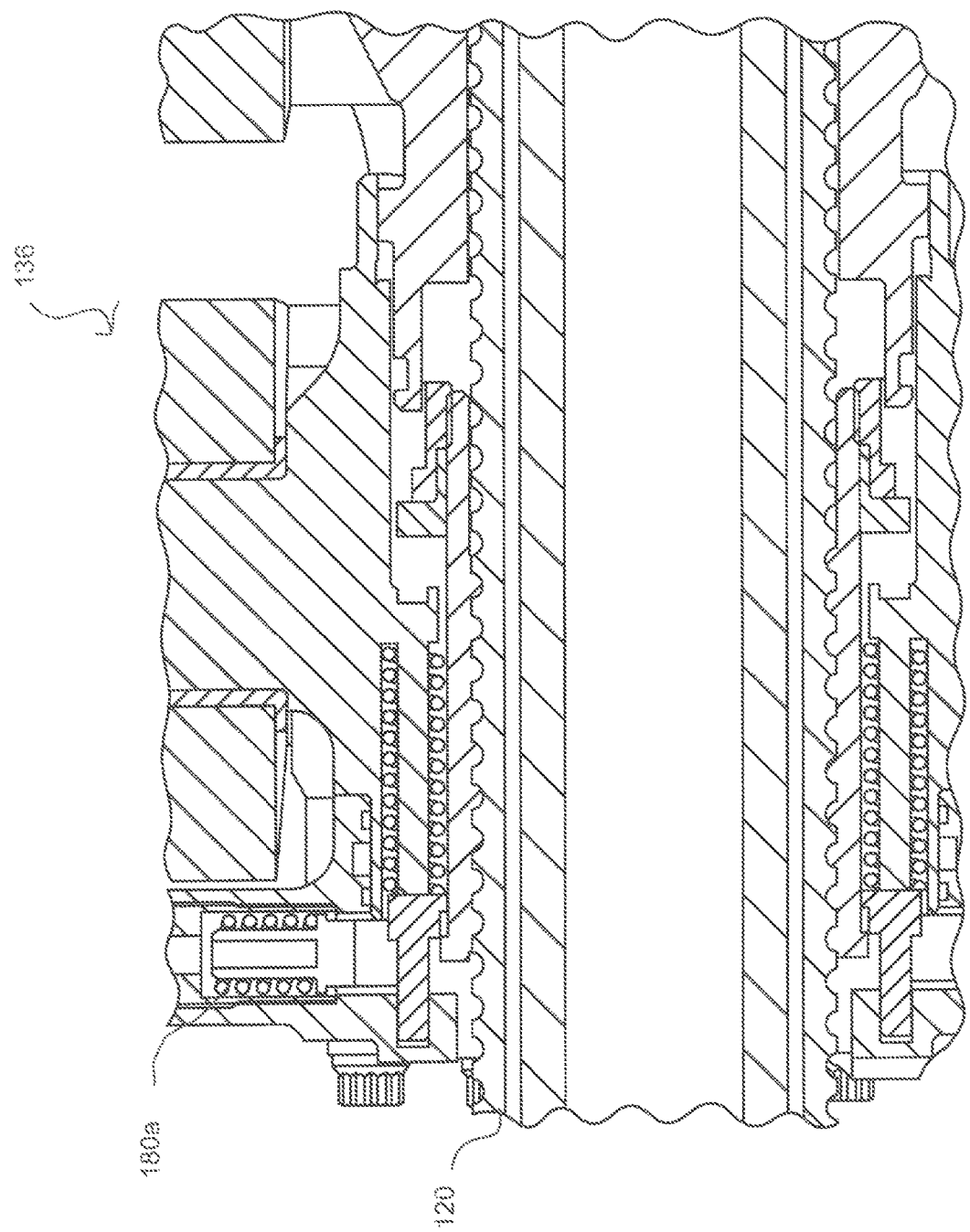
FIG. 6 is another cross-sectional view depicting the upper attachment assembly of the stabilizer actuator with LVDTs driven by a secondary ball nut.
Figure 7:
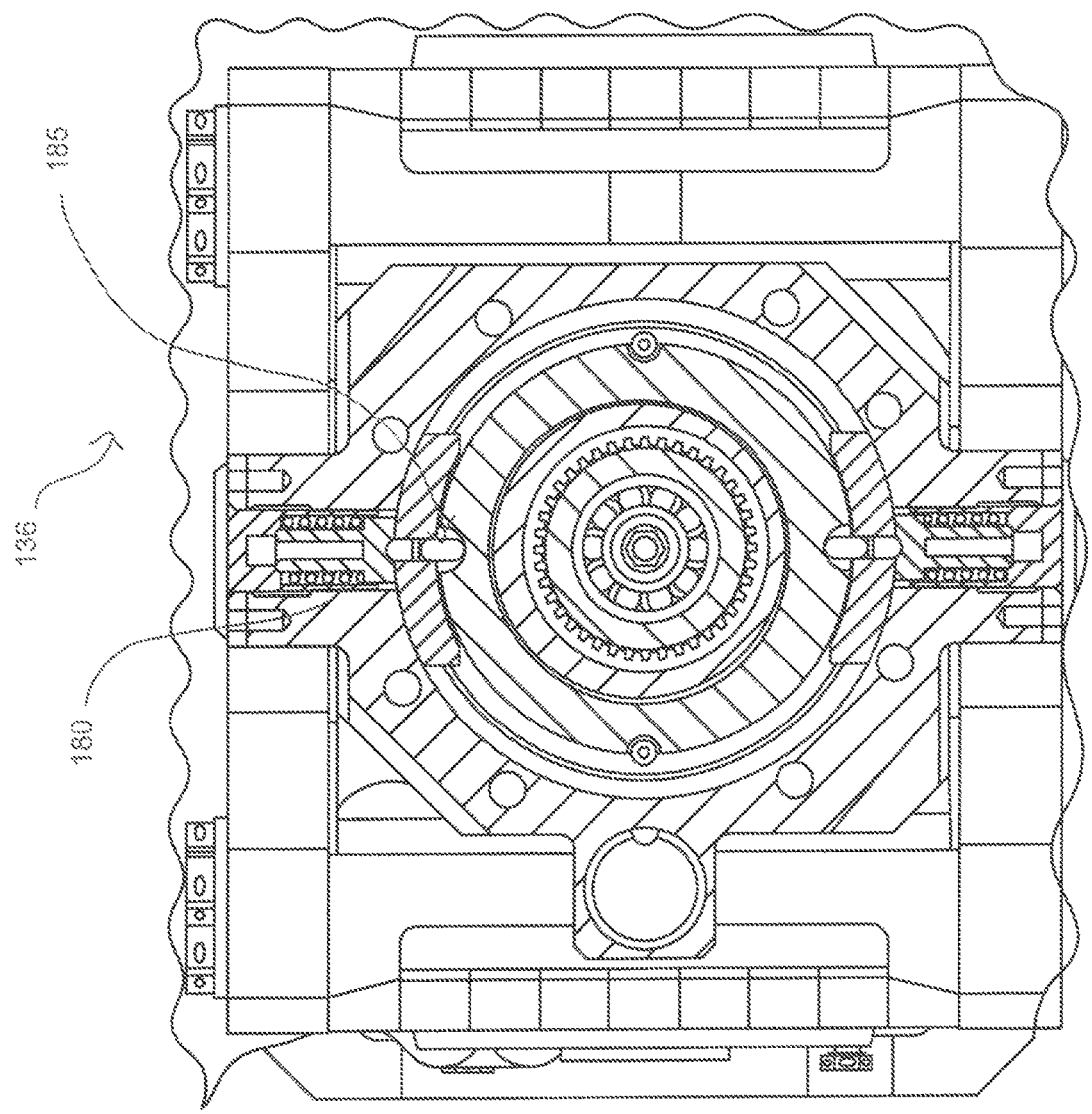
FIG. 7 is a transverse cross-sectional view depicting the upper attachment assembly of the stabilizer actuator with LVDTs driven by a secondary ball nut.
Figure 8:
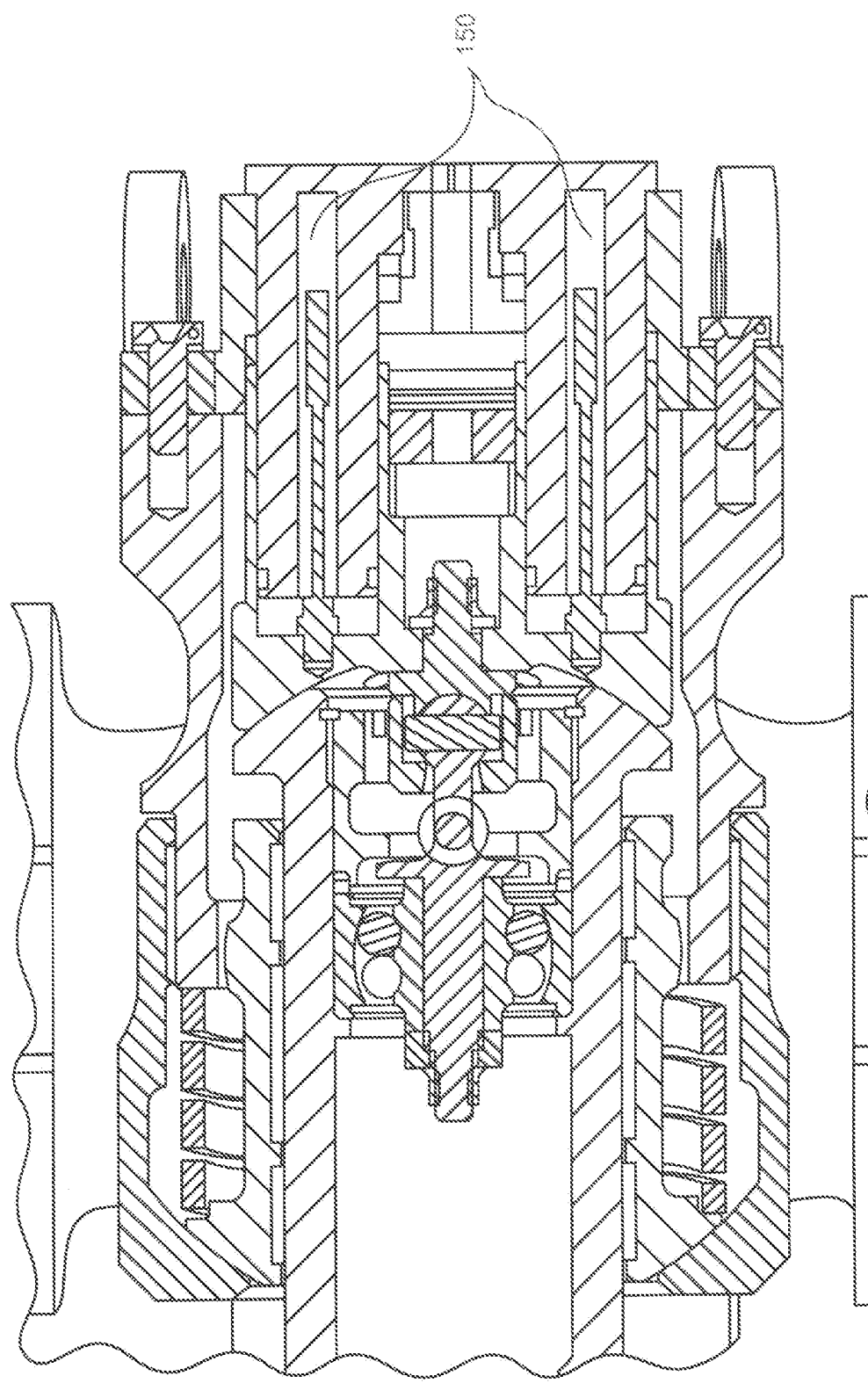
FIG. 8 is a cross-sectional view depicting the lower attachment assembly of the stabilizer actuator with LVDTs and tie rod.
Figure 9:
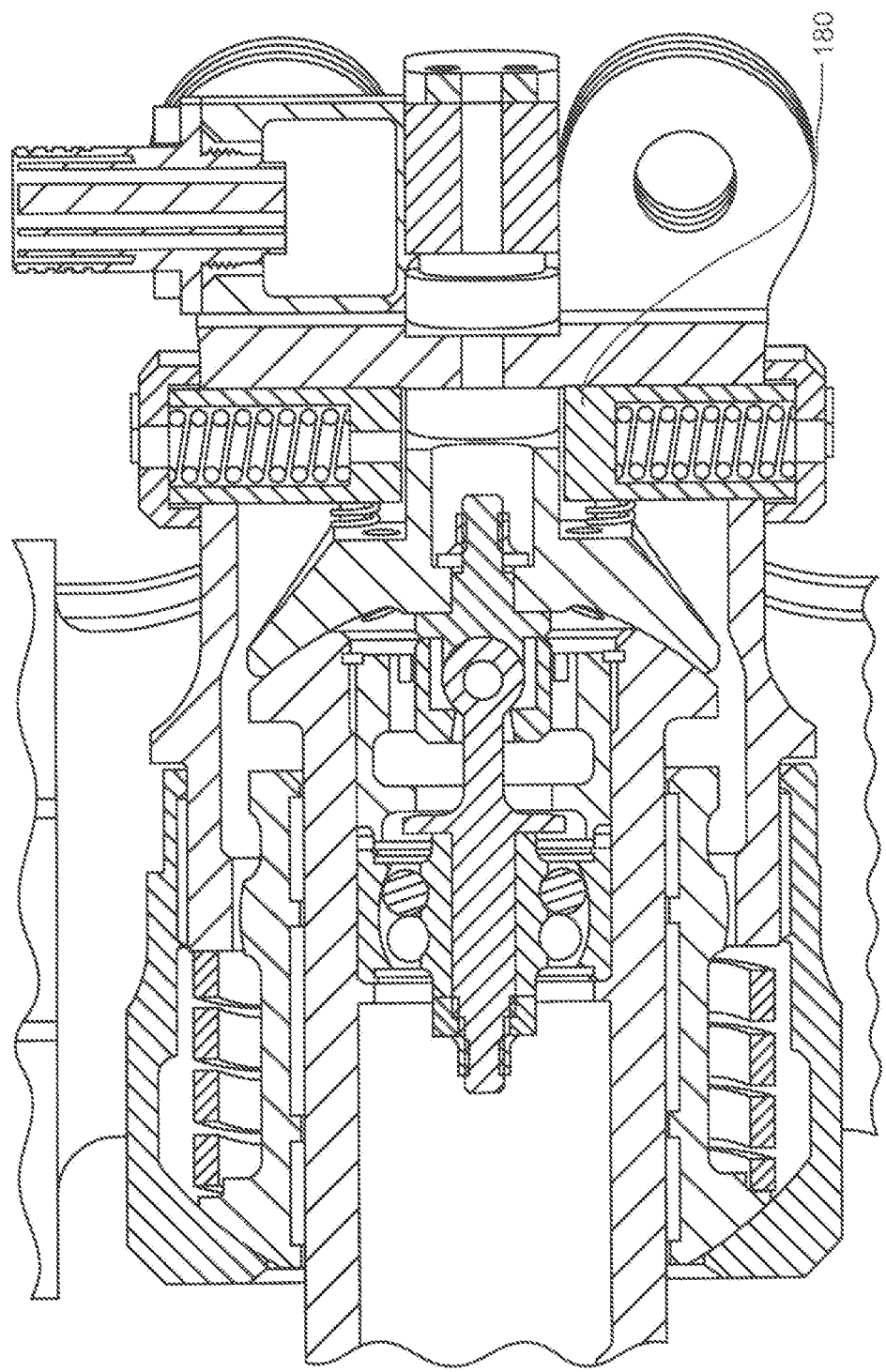
FIG. 9 is another cross-sectional view depicting the lower attachment assembly of the stabilizer actuator with locking keys and tie rod.

A secondary load path is provided by the secondary load path section 136. The secondary load path section 136 includes a secondary housing assembly 140. The secondary load path is unloaded through a suitable mechanical clearance with the primary path while the primary path is in an operative state (in other words, not in a failure state). In case of a primary load path failure, the load is transferred to the secondary load path only after a relative motion between the two paths. Monitoring this relative motion between the two paths with a sensor (particularly a position sensor) is a practical way of detecting the primary path failure. This motion is equal to the built-in mechanical clearance and may be measured by one or more LVDTs 150 and 150a as seen in FIG. 5, for example. LVDTs are electromechanical transducers that convert rectilinear motion of externally coupled objects into electrical signals that are proportional to the positions of the objects. Important characteristics of a practical LVDT include (i) the ability to produce a linear output signal over a relatively large displacement range relative to the overall length of the device, (ii) durability and reliability, and (iii) relatively low cost of manufacture.

During normal HSTA operation, LVDT 150 and 150a displacement is minimal, equivalent to a sum of backlash and elastic deformation of the structural load path members under load. When any member of a primary load path fails, the displacement exceeds a predetermined value and the failure is detected. This predetermined value may not be equal to the full mechanical clearance and may include a predetermined range of values. Partial structural failure may only result in abnormal structural deflections and limited relative motion between paths. The use of position sensors enables the detection of such partial failures.

In one proposed embodiment, two LVDTS 150 (one per electrical channel) may be used as shown in the figures for the drive motor and gear assembly 124. The two LDVTs 150 on the right in FIG. 8 and shown again in FIG. 10 will detect any structural failure in the upper primary attachment system components including, for example, in FIG. 3 the main housing 160, gimbal 126, primary attachment pins 164, and the ball screw 120. The load is transferred to a tie rod 165 inside the ball screw 120 and independently attached to the aircraft structure with controlled clearance.

Figure 10:
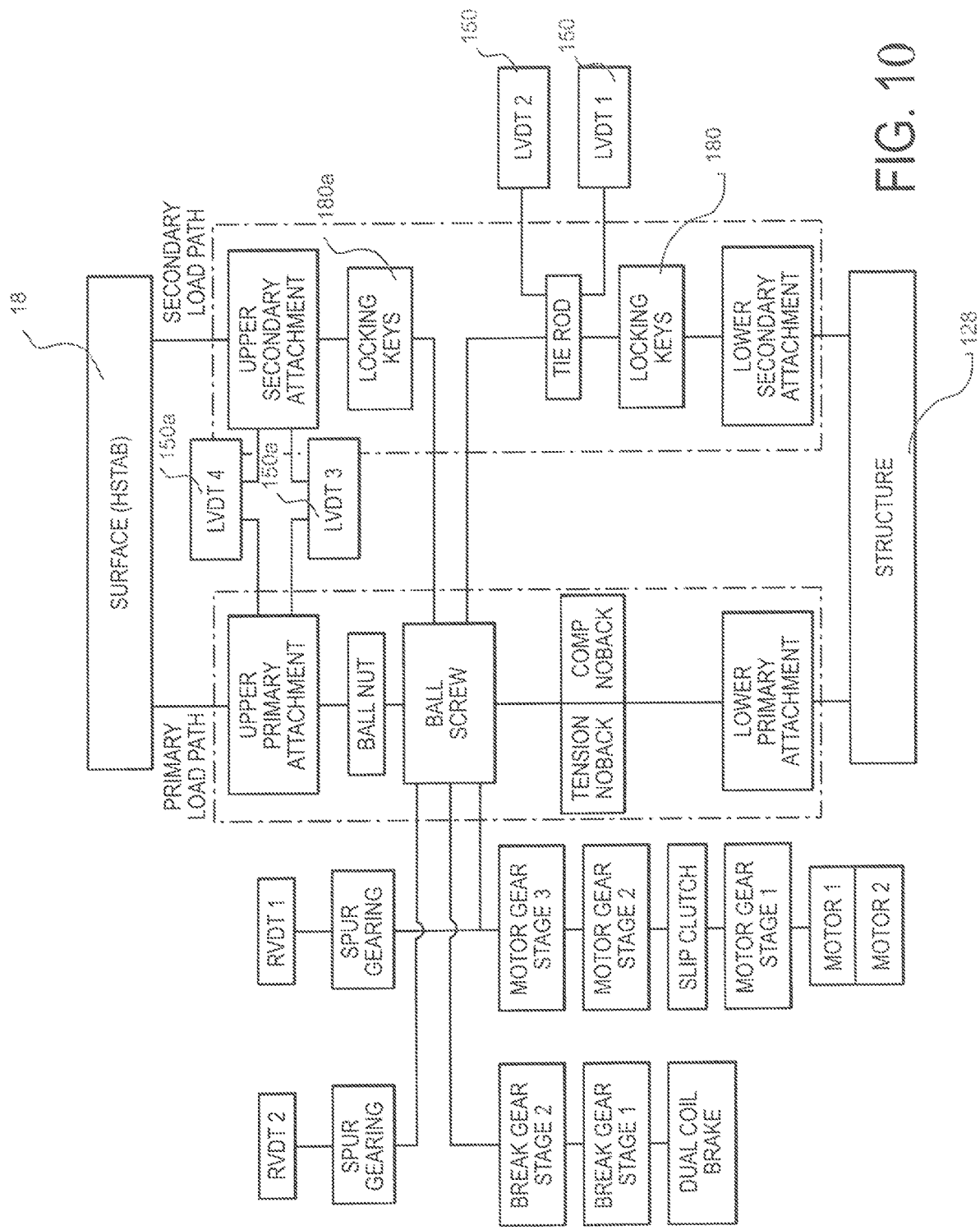
FIG. 10 is a schematic depicting the mechanical interrelationships of the actuation system.

The LVDT's 150a on the right in FIGS. 5 and 10 would detect failures of any structural member of a moving group of parts on the right, or the lower primary attachment system, such as primary nut gimbal housing 142, primary ball nut assembly 116 or ball members, or trunnion 166. The load is transferred to a secondary ball nut assembly 136 on the ball screw 120 that is independently attached to the aircraft structure with controlled clearance.

In both cases, the failure would result in a relative motion between the primary to the secondary path and will be detected by the LVDT's 150a. The displacement may be any appropriate value but may account for normal elastic structural deflections of the primary load path without imparting load to the secondary load path and may include an additional amount if needed to release spring locks 180a in secondary nut assembly 136, or 180 in drive motor and gear assembly 124, if so equipped, to hold the stabilizer position fixed without excess backlash. Note that under normal loads with an intact primary load path, elastic deflections of the primary load path relative to the unloaded secondary load path, due to the load and primary structural stiffness result in displacement of the LVDTs, hence, a change in sensed position. This change in position is nominally linear with the applied load such that the LVDT position may be used as an indication of the applied load.

Figure 11:
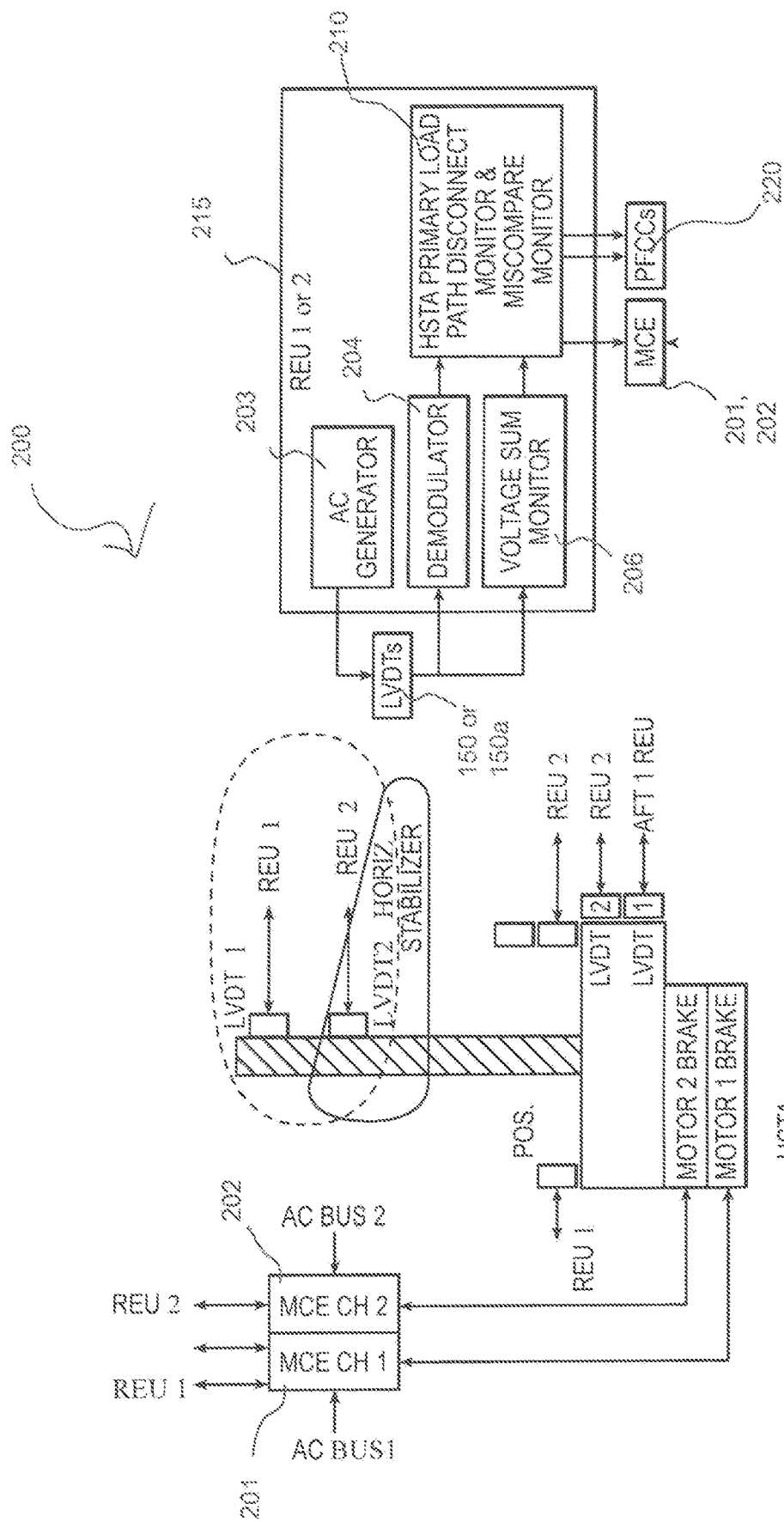
FIG. 11 is an overview schematic of a flight control system including the stabilizer actuator and electrical control systems.
Figure 12:
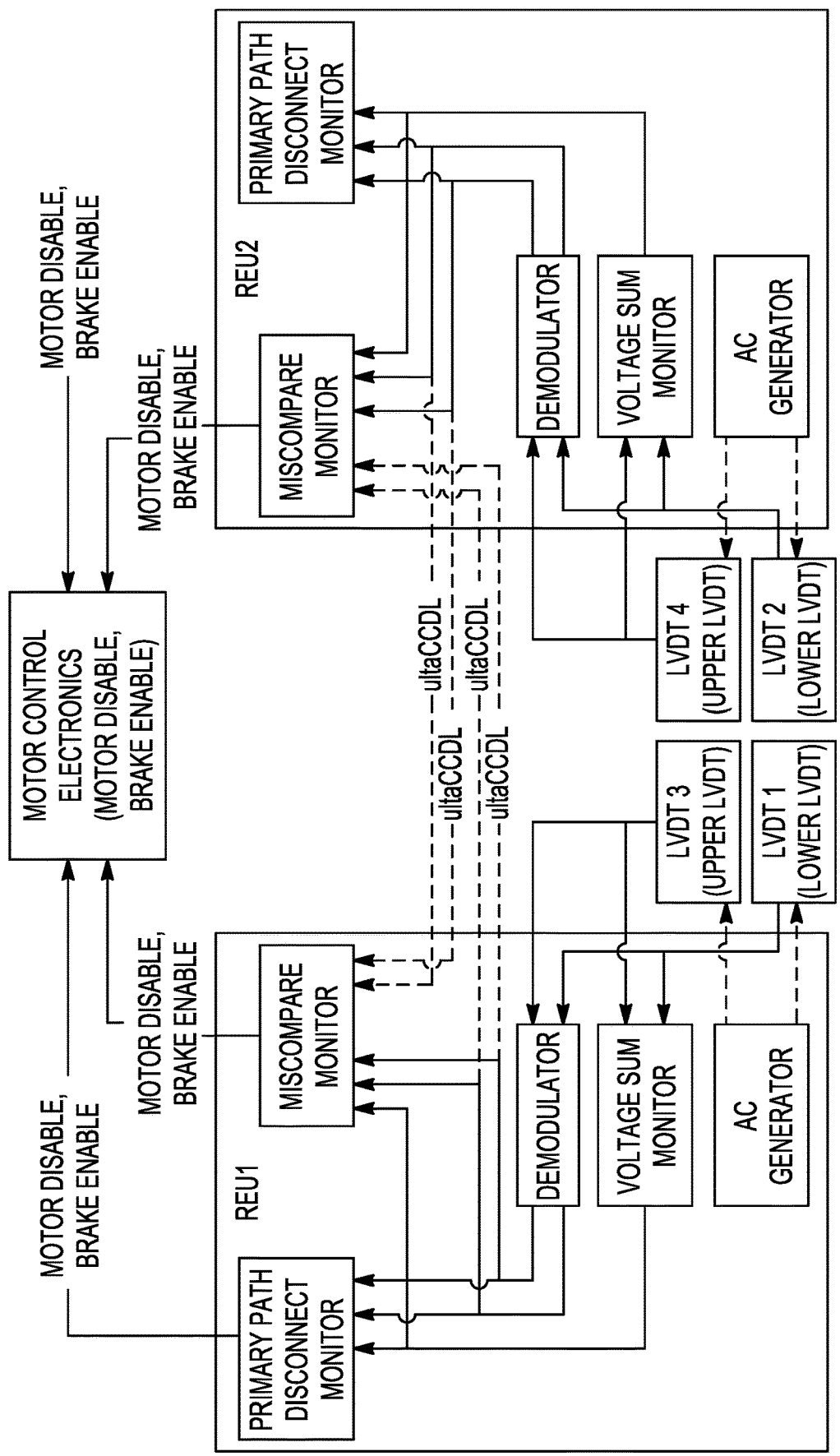
FIG. 12 is a schematic of the control architecture for a flight control system.

Looking to FIGS. 11 and 12, illustrated is a control system 200 that includes motor control electronics 201, 202 that send commands to the motor(s) and receive commands from the remote electronics unit REU 215 (note the REU may be part of the primary flight control computer 220 or part of the motor control electronics (MCE) 201,202). The LVDTs 150 and 150a may receive power from an A/C generator 203 and send signals to, for example, a demodulator 204 and/or a voltage sum monitor 206. The demodulator and voltage sum monitor may both provide an input to the primary load path disconnect monitor 210.

The disconnect monitor 210 may be programmed with logic that reads the LVDT position as a function of load, calculates the load based on known stiffness of the primary load path and makes a determination as to if an overload or jam condition exists. For example, if a relative displacement between the primary load path and the secondary load path is within a predetermined range of values, one of 3 states can be determined:

a. Plus or minus displacements within the actuators normal elastic range indicate the actuator and loads are normal—Normal operation is maintained.

b. Displacements between the upper normal range and the displacement associated with a predetermined overload threshold indicate that an excess external load or an external jam is taking place—Motor is commanded to zero velocity and/or the parking brake function is engaged. This failure response may be reset back to normal once the excess displacement, hence load is relieved. Stopping the motor and/or locking the parking brake reduce the total load applied to the jam based on the actuators speed, time from detection to arrest of actuator motion and the stiffness of the actuator and structure. In general, HSTA motion is relatively slow and total load loop stiffness sufficiently load to allow sufficient time to detect and stop the system prior to excessive load creation c. Displacements above the overload threshold and the maximum failed primary load path displacement indicate the primary load path has failed and result in command of the motor to zero velocity and application of the parking brake function. This fault is not resettable without repair of the actuator or attaching structures. Further, the annunciation may include an audible, visual, or other alert to the pilot, to a flight log, or to any other interested party or system component.

The voltage sum monitor 206 may be used to validate LVDT 150 or 150a input data. For example, in a case with two or more LVDTs monitoring the same location, the voltage sum monitor can help determine if there is a faulty LVDT. In one embodiment, any LVDT that has been assessed to be failed, the signal of that LVDT can be excluded from the disconnect monitor. In one embodiment, if two LVDTs at the same location are declared faulty, the actuator can be locked as a safety precaution. An LVDT may be assessed as failed when the displacement is indicated to be greater than the predetermined range of values that indicate a failure of the primary load path. Alternatively, an LVDT may be assessed as failed when the voltage sum monitor is out of a normal range of values applicable to a health LVDT.

Further, if the disconnect monitor registers a primary load path failure prior to (MCE) 201 or 202 mode engagement, the primary flight control computer(s) 220 may command the MCE such that the actuator 100 remains locked. The LVDT detection scheme described above can provide earlier and safer fault annunciation, particularly with respect to conventional systems that use mechanical means for detecting primary load path failure and transferring load to a secondary load path. While the LVDT detection scheme provides significant improvement over mechanical systems to detect and annunciate primary load path failures, in many cases the actuator output force must also be limited to prevent damaging the downstream structures. This load limiting is typically done with mechanical torque brakes, load brakes or slip clutches.

In accordance with the present invention, the failure detect position sensor is used as a load sensor to further enhance failure detection. More particularly, displacement data from the sensor is converted to load, and the load is used to determine if a jam event has occurred. When the sensed load exceeds a predetermined threshold, typically a small amount above the maximum operating load, the system signals the motor to stop, applies the parking brake or both thus limiting the build-up of load into the system.

For electromechanical actuators that require the output load be limited in the event of a jam in the aircraft structure, the traditional methods of providing this protection is to incorporate a torque limiting device (Torque Brake or Slip Clutch) upstream of the rotary to linear output device (Acme Screw, Ball Screw, roller screw or similar). These devices need to be set at sufficiently high levels to allow driving of the desired maximum output load at the lowest specified operating temperature (i.e., lowest overall mechanical efficiency). With these high settings it is not uncommon to exceed the maximum allowable output load when the actuator is at normal or high temperatures where the overall mechanical efficiency tends to be much higher.

For high load, low speed systems the time to achieve maximum output is often relatively long due to the need to preload the inherent spring rates of the actuator and the associated output structures. In cases where this jam time is sufficiently long and where a method of measuring the output load, such as with the above-mentioned primary load path failure disconnect sensors, it is possible to provide load limiting by commanding the motor to zero rpm and applying the parking brakes following a load indication exceeding the maximum output load. This level of load limiting can be significantly more sensitive than the mechanical torque limiting device allows thus providing a lower overall output load.

As discussed above, the actuator uses LVDTs between the primary and secondary load paths in order to detect a primary load path failure based on travel of the LVDT past a specified threshold. Since the LVDTs are between the normally unloaded secondary load path and the normally loaded primary load path, and since all actuator features between these two paths have some inherent compliance, there is a linear relationship between the LVDT reading and the output load under normal operating load conditions. This relationship can be used as a load sensor. In this case the actuator may have one or both of a motor controller that can drive the motor to zero rpm in a short period of time (100 msec) and/or a parking brake that can further assist in bringing the motor and system to a stop. When the load sensor senses a load above the intended maximum operating load the controller may either drive the motor to zero rpm or apply the brake, or both, while the actuator is winding up the overall system compliance. The spring rate or compliance of the system allows sufficient time to stop the motor thus limiting the output load.

Figure 13:
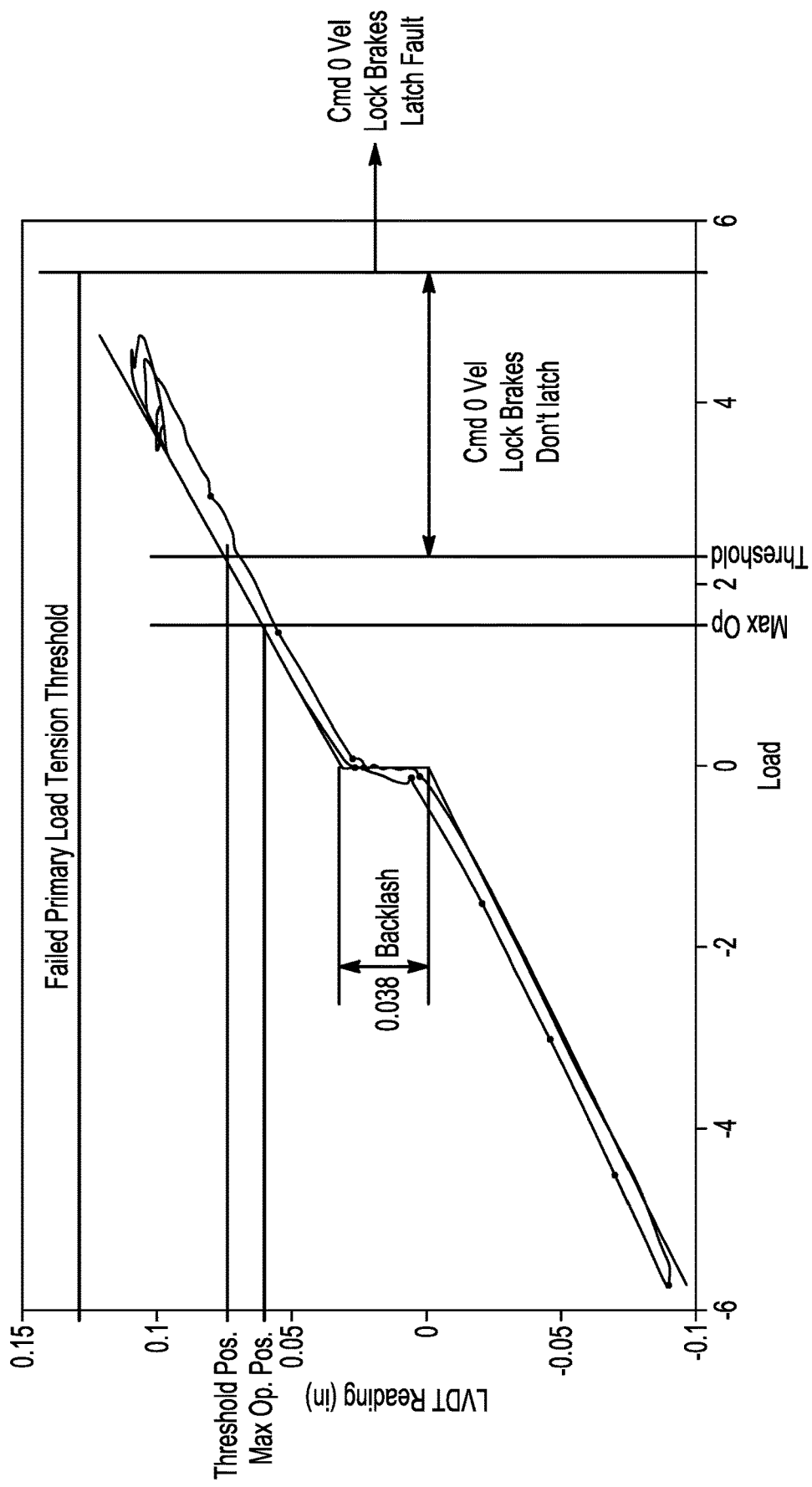
FIG. 13 is a graph showing a linear relationship of displacement vs. load on the primary load path.

Referring to FIG. 13, the relationship between LVDT position vs. load is graphically shown. As can be seen, the relationship is linear throughout substantially all of the LVDT travel, with a slight step change near zero load/zero travel due to backlash in the system. To minimize the effects of backlash, the LVDTs electrical null position may be centered in the backlash and/or an offset may be included LVDT sensing algorithm to compensate for the backlash to allow increased accuracy of the load reading based on LVDT displacement.

Since the relationship between load and position is linear, load can be approximated based on LVDT position. For example, if the LVDT position exceeds a first prescribed position limit (including a built-in margin), it can be inferred that the load has exceeded a prescribed "shutdown" load limit, the load being possibly due to a jam condition. The "shutdown" load limit may be set to a threshold level that is less than the load that triggers a fault condition. Upon the position exceeding the prescribed position limit, the actuator can be commanded to turn off and the brake can be set, thereby stopping motion. Such shutdown occurs quickly, with actuator shutdown being almost instantaneous. Both motor command to zero and brake response can be 100 msec or less. This is significantly less than the elapsed time for system windup due to a jam event, which for an aircraft stabilizer typically exceeds 350 msec. In this manner, excessive load can be avoided prior to a fault condition being triggered, and thus system operation may still be possible.

Accordingly, two different protections schemes may be implemented, a first being based on a linear (or substantially linear) relationship being load and displacement, and a second being based on mechanical movement transferring load from a first load path to a second load path.

Figure 14:
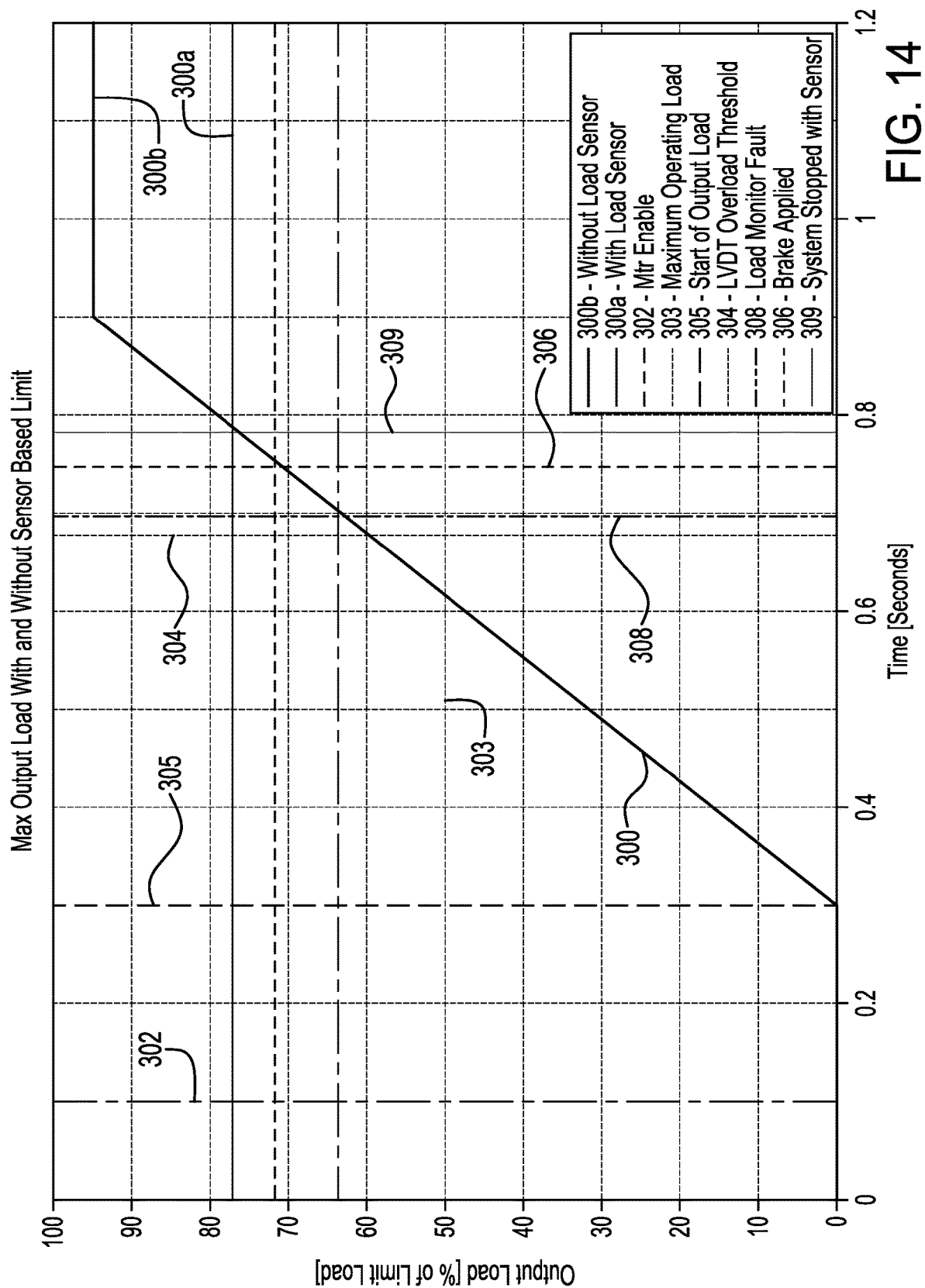
FIG. 14 is a graph showing load on a primary load path undergoing a jam event for both a conventional load limiting scheme and a load limiting scheme in accordance with the invention.

FIG. 14 graphically illustrates operation of a stabilizer system that includes load sensing based on LVDT position as well as a system that does not include load sensing. More particularly, FIG. 14 illustrates load 300 on a primary load path, where the actuator is initially disabled and then enabled at about 0.1 seconds as indicated by the line 302. Primary load path load 300 is relatively constant (the primary load path does see load, but due to the large range shown in FIG. 14 it appears constant). At about 0.3 seconds a jam occurs and load 300 increases. As the actuator continues to operate, the load on the primary load path continues to increase and eventually exceeds the threshold 304 (e.g., at about the 0.7 second mark). At this point the actuator is disabled, the parking brake is enabled and, approximately 70 msec later the brake is engaged as indicated by the line 306. As can be seen in FIG. 17, the load 300a on the primary load path is clamped at about 75% of limit load.

For comparison purposes, FIG. 14 also shows operation of the same system without load sensing. More specifically, at the 0.3 second mark a jam occurs and load on the primary load path increases. At approximately 0.9 seconds the actuator torque limiting device activates and the actuator motion, hence load increase, is stopped, at which point the load on the actuator system has continued to increase to about 95% of limit load, leaving very little margin in the system.

Accordingly, in a system that employs a displacement sensor, such as an LVDT, as a load sensor relative to a system that does not, the load subjected to the system is reduced by approximately 20% or more depending on system architecture. The method is particularly well suited in systems that are slow to develop load, e.g., systems in which the time between a jam event occurs until the load limit is reached is greater than 350 milliseconds. As this time increases, the more precise triggering based on displacement becomes.

Figure 15:
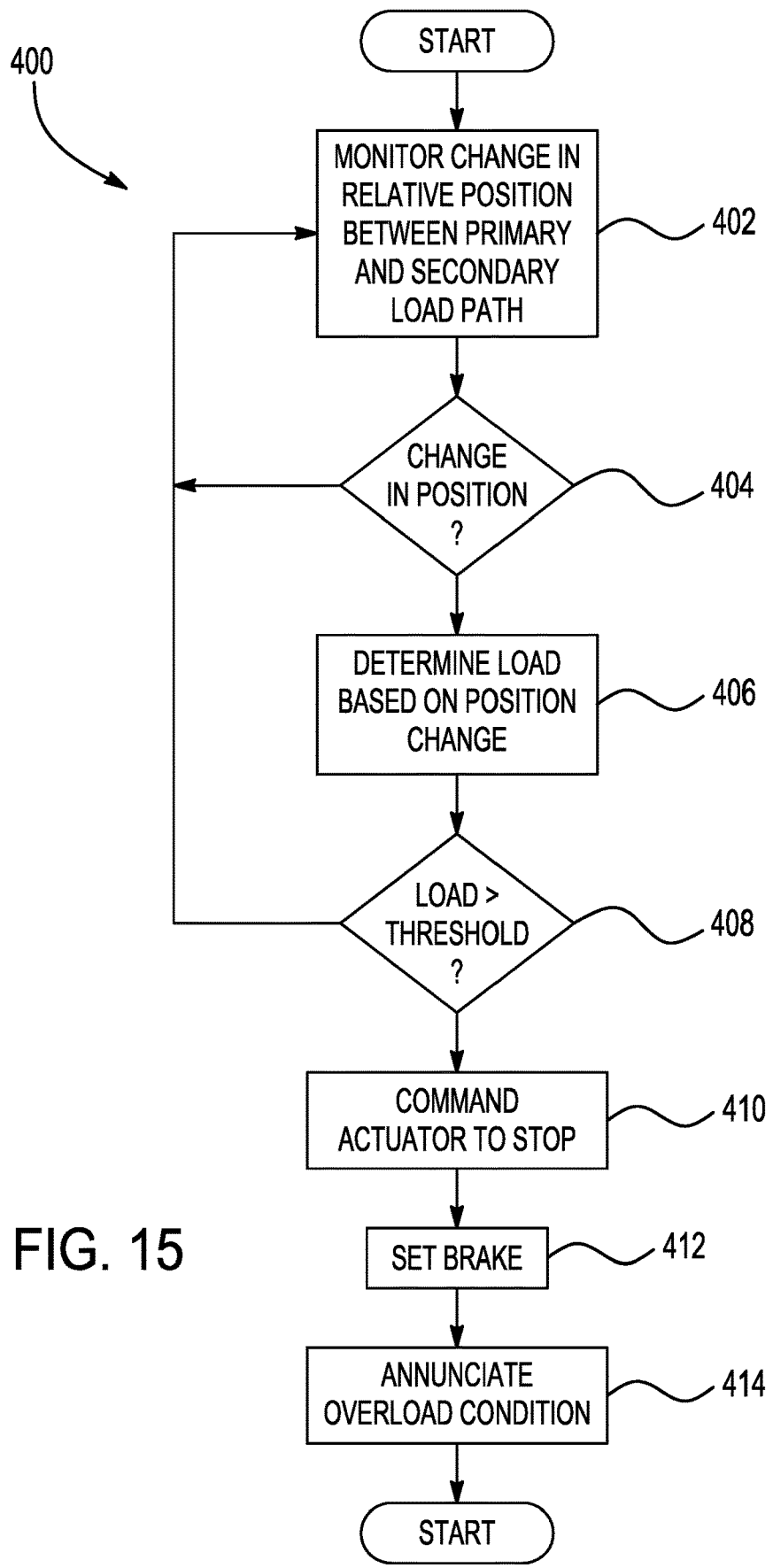
FIG. 15 is a flow chart illustrating an exemplary method of using displacement information to estimate a load on a load path in accordance with the invention.

Referring now to FIG. 15, illustrated is a flow diagram 400 that depicts an exemplary method for monitoring a load on a load path based on displacement data from a sensor. Although the method descriptions and flow chart may show specific orders of executing steps, the order of executing the steps may be changed relative to the order described. Also, two or more steps described in succession may be executed concurrently or with partial concurrence. One or more of the described or illustrated steps may be omitted.

The exemplary method of FIG. 15 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Typical non-transitory computer readable media include electronic memory devices, magnetic memory devices and optical memory devices. The method may be executed by a controller, such as controller 210. In one embodiment, to carry out the method, the logical instructions embodying the method are executed by a processor of the controller 210. Alternatively, the method may be at least partially implemented in hardware of the controller 210 (e.g., an application-specific integrated circuit (ASIC) or the like or may be implemented in entirely or partially in analog circuitry if desired.

The method may begin at step 402 where displacement data from a sensor is obtained. The sensor may be, for example, a position sensor that provides position data indicative of movement of one object relative to another object. In one embodiment, the sensor is an LVDT sensor, and the position data is representative of a change in position of a primary load path relative to a secondary load path.

Next at step 404 it is determined if a change in position has occurred. If a change has not occurred, then no action is necessary, and the method moves back to step 402. However, if a change in position is detected, this may indicate that the primary load path is undergoing high and/or excessive load and the method would move to step 406.

At step 406, the load on the primary load path is determined based on a relationship between displacement and load. As illustrated in FIG. 13, in an actuator assembly for an aircraft flight surface having a primary load path and a secondary load path, load on the primary load path has a linear relationship with displacement of the primary load path relative to the secondary load path. Thus, by measuring the displacement the load on the primary load path can be determined. For example, the load on the primary load path may be measured for various displacements of the primary load path relative to the secondary load path. The measured load data then may be entered in a look-up table along with the corresponding displacement data that generated the load. In use, the load can easily be determined by accessing the look-up table based on the measured displacement and retrieving the corresponding load value for the measured displacement.

Next at step 408 the determined load is compared to a load threshold level. The load threshold level may be a predetermined value that indicates the load is excessive and/or may be indicative of a jam event. If the determined load is not greater than the threshold then no action is necessary, and the method moves back to step 402. However, if the determined load is greater than the threshold, then a jam event may be occurring. To prevent the load on the primary load path from further increasing, at step 410 the actuator associated with the primary load path is commanded to halt any further motion. In this manner, no further force is applied by the actuator to the primary load path. Further, at step 412 a brake associated with the primary load path may be commanded to engage, thereby providing an additional means for halting motion of the actuator system. Use of the brake can also aid in reducing the time required to halt motion of the actuator system. The method then moves to step 414 where the overload condition is annunciated, for example, by generating a warning alarm. The alarm may be annunciated visually and/or audibly so as to provide an alert that action may be required.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An actuator assembly comprising:
   a primary load path for tightly coupling an actuated surface to a reference structure;
   a secondary load path having a backlash portion for coupling the actuated surface to the reference structure with backlash, wherein the secondary load path is unloaded during an operative state of the primary load path and loaded during a failure state of the primary load path;
   an actuator system operatively coupled to the primary load path and the secondary load path, the actuator system including an actuator being operative to effect motion along at least the primary load path;
   a first sensor configured to sense relative displacement between a portion of the primary load path and a portion of the secondary load path; and
   a controller operatively coupled to the first sensor, the controller being configured to:
   convert relative displacement data sensed by the first sensor in combination with primary load path structural stiffness to load data representing a load on the primary load path; and
   command the actuator to halt motion along the primary load path upon the load on the primary load path as determined from the load data exceeding a prescribed threshold less than an excessive load at which structural damage along the primary load path occurs.

2. The actuator system of claim 1, wherein the first sensor comprises a position sensor.

3. The actuator system of claim 1, wherein the first sensor comprises a linear variable differential transformer.

4. The actuator system of claim 1, further comprising a mechanical brake configured to selectively inhibit motion along at least the primary load path, wherein the controller is configured to command the brake to inhibit motion along at least the primary load path upon the determined load exceeding the prescribed load threshold.

5. The actuator system of claim 1, wherein the controller determines the load based on a linear relationship between load on the primary load path, a relative stiffness between the primary and secondary load paths, and relative displacement between the primary and secondary load paths.

6. The actuator system according to claim 1, where the controller is configured to sense the failure state of the primary load path when the load exceeds a predetermined value.

7. The actuator system of claim 6, wherein the controller is configured to detect a jam state in one of an upper or lower primary attachment system.

8. The actuator system of claim 6, wherein the controller is configured to detect a failure state in at least one of a main housing, gimbal, primary attachment pins, or the ball screw of the primary load path.

9. The actuator system of claim 6, wherein the controller is configured to detect a failure state in at least one of a primary nut gimbal housing, primary ball nut assembly, or trunnion.

10. The actuator system of claim 6, further comprising a second sensor, wherein the controller is configured to detect a failure state in the other one of an upper or lower primary attachment system.

11. An aircraft, comprising:
a flight control surface arranged on the aircraft; and
the actuator assembly of claim 1 operatively coupled to the flight control surface.

12. A method for determining load on a primary load path of an actuator comprising:
receiving sensor signals from one or more sensors;
determining a relative displacement between a portion of the primary load path and a portion of a secondary load path based on the received signals;
converting the relative displacement based on the received signals from the one or more sensors in combination with primary load path structural stiffness to load data representing a load on the primary load path; and
commanding an actuator to halt motion upon the load on the primary load path as determined from the load data exceeding a prescribed threshold less than an excessive load at which structural damage along the primary load path occurs.

13. The method of claim 12, wherein inhibiting motion comprises at least one of commanding an actuator operative to effect motion along the primary load path to halt motion along the primary load path or commanding a brake operatively selectively inhibit motion along the primary load path to inhibit motion along the primary load path.

14. The method of claim 12, wherein determining the load comprises using a linear relationship between load on the primary load path, a relative stiffness between the primary and secondary load paths, and relative displacement between the primary and secondary load paths.

15. The method of claim 12, further comprising:
comparing the relative displacement to a predetermined range of values; and
annunciating a jam in the primary load path if the relative displacement is within the predetermined range of values.

16. The method of claim 15, wherein the predetermined range of values is a range centered around a value determined by a summation of the amount of structural deformation in the primary load path during an operative state and an amount of backlash required for triggering a locking key to engage the secondary load path.

17. The method of claim 16, wherein annunciating the failure includes locking an actuator that effects motion along the primary load path.

* * * * *